May 3, 1966 A. R. SHEETS ET AL 3,249,680

INSULATING, HEAT-SINK HOLDER FOR TRANSISTORS

Filed April 14, 1964

INVENTORS:
Allen R. Sheets &
Donald L. Utz
by Greene and Durr
ATTORNEYS.

United States Patent Office 3,249,680

Patented May 3, 1966

3,249,680
INSULATING, HEAT-SINK HOLDER FOR TRANSISTORS

Allen R. Sheets, Oak Ridge, and Donald L. Utz, Pompton Lakes, N.J., assignors to National Beryllia Corp., Haskell, N.J., a corporation of New Jersey Filed Apr. 14, 1964, Ser. No. 359,577
2 Claims. (Cl. 174—15)

This invention relates to a clip type of holder for transistors which is adapted to conduct heat away from the transistor without electrically connecting the transistor to a chassis or similar structure of an electronic device.

It is known that transistors in electrical circuits are sensitive to temperature increases. Thus, an increase in temperature will result in the thermal generation of "minority carriers" which increases the temperature and leads to what is known as "thermal runaway" which can cause destruction of the transistor.

Heat-sink devices have already been proposed for such transistors. A problem connected with such devices is to provide a means with good heat conductivity to withdraw heat from the transistor while maintaining the transistor insulated from ground or the chassis or from some other part of the circuit.

Among the objects of the invention is to provide a heat-sink type of clip holder for transistors which rapidly conducts heat away from the casing of the transistor and is still insulated from the main chassis or heat-sink plate to which it is attached.

The objects of the invention are attained by forming a clip means extending from one surface of a highly heat-conductive metal disk, to which is brazed, soldered or otherwise intimately secured at the opposite surface, a disk formed of beryllium oxide. The beryllium oxide disk may be provided, on its opposite exposed flat surface, with a metal coating by which it can be attached to a metal chassis or other heat conducting surface.

The clip forming portion is preferably formed from flat spring stock such as beryllium copper strip. This strip can be cut to a length adapted to extend around the metal disk and then curved and brazed to the metal disk.

The metal disk is preferably formed of a metal of high heat conductivity which is softer and readily brazed to the beryllium copper clip portion and to the beryllium oxide disk portion. Copper, as well as bronze, brass and similar soft alloys of copper, are satisfactory for the metal disk.

Figure 3:
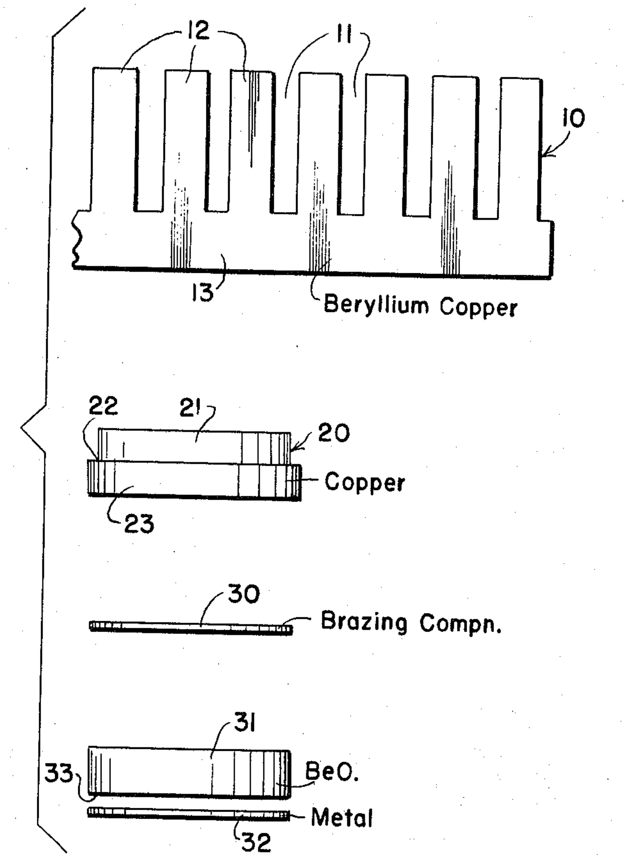
FIG. 3 is an exploded view of the parts required to make the device of the invention.

As illustrated in FIG. 3, the clip of the invention comprises the spring strip member 10, the metal disk portion 20, a brazing layer 30 (which is not necessarily in the form of the thin disk shown when applied between parts 20 and 31), the BeO disk 31 and preferably a metal conducting layer 32 which also is not necessarily in the form of a thin disk when applied. As indicated, the brazing layer 30 and metal layer 32, have been added only for the sake of completeness.

Figure 1:
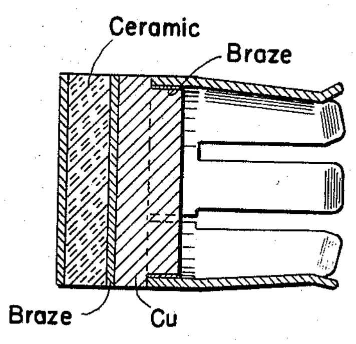
FIG. 1 is a side cross-sectional view of the device of the invention.
Figure 2:
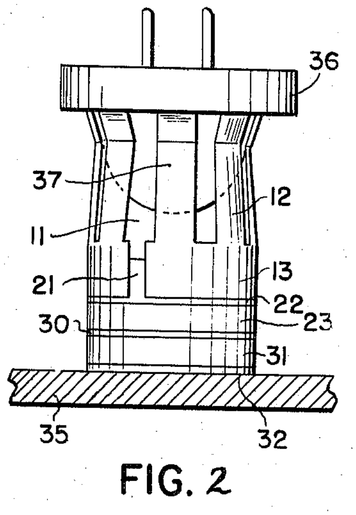
FIG. 2 is a view of the device with a transistor clipped thereto.

The spring strip member 10 is formed with a plurality of equally spaced cut-out portions 11, forming the fingers 12 and the linear base portion 13. After cutting to the proper length, the strip 10 may be rolled to cylindrical form and simultaneously the fingers 12 may be bent to the shape shown in FIGS. 1 and 2. The strip 10 is then brazed to the portion 21, above shoulder 22 of the metal disk 23. The shoulder 22 of disk 20 provides an accurate guide and stop for brazing the rolled strip 10 thereto. As shown in FIG. 2, when the edge 13 of rolled strip 10 is applied to portion 21 of disk 20, a gap 14 is formed where the two ends of edge or base portion 13 do not quite meet. Since the strips of the invention may be quite small, about 0.5 mm. in diameter, for example, machining to close tolerances is avoided by making the inside diameter of the rolled strip 10 smaller than the outside diameter of part 21 of disk 20. The gap 14 also prevents any stagnation of air between the top of part 21 and the lower end of slots 11 of the clip member.

The metal disk 20 is brazed or otherwise united to the beryllium oxide disk 31 by any process which assures good heat contact.

The exposed surface 33, of the beryllium oxide disk 31, is then coated with metal by any of the known methods of coating ceramics with a metal soldering layer. For example, a proprietary silver composition may be painted and fired on the surface 33, or metal may be vapor deposited thereon, or the surface may be made conductive and electroplated.

FIG. 3 illustrates how the device is used, although the metal plate 35 and transistor 36 may be oriented in any position. As shown, the heat conducting fingers 12 form an easy path for heat to flow from the casing 37 of transistor 36 to the disk 21, 23 without preventing the movement of convection air currents about the casing 37. Disk 21 conducts heat through metal layer 30 to the beryllium oxide disk 31. Although the disk 31 is an electrical insulator, it is the best heat conductor of all electrical insulators and it provides an easy path for heat to flow to the metal chassis 35 or other heat conducting plate.

The features and principles underlying the invention described above in connection with specific exemplifications will suggest to those skilled in the art many other modifications thereof. It is accordingly desired that the appended claims shall not be limited to any specific feature or details thereof.

We claim:

1. An insulating heat-sink holder for transistors comprising a beryllium oxide disk having one surface thereof united throughout said surface to a metal disk of substantially the same size, a strip of spring metal being formed with a continuous side and with a plurality of fingers extending transversely from said continuous side thereof, said continuous side of said strip extending substantially but not completely around that portion of said metal disk so that said fingers extend axially in the opposite direction with respect to said beryllium oxide disk, and metallic means uniting said continuous side of said strip to said metal disk.

2. The device as claimed in claim 1 wherein said metal disk comprises one concentric portion of smaller diameter than the remaining portion, said two portions defining a shoulder, said strip being united to said smaller diameter portion so as to form a substantially continuous surface with the larger metal disk portion, except in the region where the ends of the strip approach each other.

References Cited by the Examiner

UNITED STATES PATENTS 2,964,688 12/1960 McAdam.

OTHER REFERENCES

IERC Advertisement, IERC Co., Burbank, California, received October 30, 1963.

IERC Technical Bulletin, February 20, 1964.

ROBERT K. SCHAEFER, *Primary Examiner.*

JOHN F. BURNS, *Examiner.*

J. F. RUGGIERO, *Assistant Examiner.*